United States Patent Office 3,520,821
Patented July 21, 1970

3,520,821
SEALING POROUS, POLYMERIC MATERIAL, MEMBRANES WHICH FORM CAPSULE WALLS
David J. Striley, Centerville, and James E. Williams, Dayton, Ohio, assignors to The National Cash Register Company, Dayton, Ohio, a corporation of Maryland
No Drawing. Filed Aug. 29, 1966, Ser. No. 575,542
Int. Cl. B01j *13/02;* B44d *1/44*
U.S. Cl. 252—316                                                8 Claims

ABSTRACT OF THE DISCLOSURE

A process is provided for treating, en masse, hydrophilic-material walls of minute capsules to reduce loss of the capsule contents due to permeation through the capsule walls. Capsules treated by the novel process are especially those which contain liquid materials having highly polar characteristics. The treatment includes dispersing preformed capsules in an aqueous treatment solution of polyhydric material and then isolating the capsules from the treatment solution and drying the capsule walls. The capsules are subsequently redispersed in the liquid vehicle.

---

This invention relates to an en masse treatment of the hydrophilic polymeric material walls of minute capsules, which capsules have been prepared for the purpose of containing water-soluble materials. It more specifically pertains to a method for treating the hydrophilic polymeric material walls of liquid-containing capsules by the use of polyhydric materials in order that said treated walls will have increased impermeability to the diffusion of the liquid contents. Loss of liquid by effusion and evaporation is diminished or prevented.

In a United States patent application filed Oct. 30, 1961, in the names of Carl Brynko and Gerald M. Olderman, entitled "Process for Making Capsules and Its Capsule Product" (Ser. No. 148,736) now abandoned, a method is disclosed for the en masse preparation of minute capsules by the exchange of original water-insoluble, low-polarity capsule contents for a new and different liquid material which was mutually soluble in the original capsule contents and the aqueous manufacturing vehicle. Such an exchange of encapsulated materials through the capsule walls takes place by countercurrent diffusion—outwardly of the material initially contained within the capsule and inwardly of the exchanging liquid material—and continues to the establishment of an equilibrium between the capsule interior and its exterior with regard to solute material concentrations. By the use of said "through-the-wall" exchange techniques, many water-insensitive materials were encapsulated and retained within the hydrophilic walls of capsules. However, it has remained impossible, up to this time, to retain within the hydrophilic walls of capsules which have been removed from the equilibrium liquid environment for longer than several hours, water-soluble materials, such as ethanol, which are so polar as to have dielectric constants above about 20.

It is, therefore an object of this invention to provide a method for post-treatment of the hydrophilic polymeric material walls of capsules, which capsules have, as contents, highly polar liquid materials with dielectric constants greater than about 20, to seal them against loss of contents through the wall.

It is a further object of this invention to provide a method for post-treatment of the hydrophilic polymeric material walls of capsules with an aim toward improving the physical characteristics of such capsules, which capsules have been prepared by the exchange, by diffusion through the wall, of organic liquid materials either highly polar or not.

It is a further object of this invention to provide an improved method for the en masse preparation of minute capsules which contain organic liquids by an exchange-through-the-wall of encapsulated materials.

Capsules which have, as walls, hydrophilic polymeric material can be prepared to contain water-soluble, highly polar, liquid materials by the use of an exchange, by diffusion, of some original capsule core material for the new water-soluble material. The capsules, when initially manufactured by the process of phase separation from an aqueous medium, can be transferred from the aqueous manufacturing vehicle to a system which consists essentially of the material which it is desired to exchange into the capsule. These minute capsules, having walls of hydrophilic polymeric material and containing a water-insoluble organic material, are used as one ingredient in the practice of this invention.

The preparation of minute capsules is well known, being the subject of several issues United States Pat. No. 2,800,457, which issued July 23, 1957, on the application of Barrett K. Green and Lowell Schleicher; No. 3,041,289, which issued June 26, 1962, on the application of Bernard Katchen and Robert E. Miller; and No. 3,190,837, which issued June 22, 1965, on the application of Carl Brynko and Joseph A. Scarpelli. Although capsules prepared by the general methods outlined in the above-cited patents are preferred, any eligible capsules can be used in the practice of this invention. Capsule eligibility is dictated by the following requirements:

(1) must have water-swellable or water-sorbing (hydrophilic polymeric material) walls, and
(2) must contain essentially water-insoluble materials which, in turn, are readily dissolved by the exchange liquid vehicle. The capsules can be of any convenient or desired size ranging from 5 to 5,000 microns in diameter or perhaps slightly larger and can be used in the water slurry in which the capsule walls are in the swollen state, or the capsule walls, if dry and unswollen, can be re-swollen, in water.

The difference between loss of internal phase by diffusion through a dried capsule wall and exchange of one encapsulated material for another material should be made clear so as to avoid confusion of terms in the following disclosure. The new encapsulated internal phase tends to diffuse through the capsule-wall-retaining membrane in a new medium; and, if the new medium is air, in the case of volatile materials, said internal phase is evaporated into the surrounding atmosphere. Encapsulated liquids of low total polarity (i.e., having a low dielectric constant) suffer only slight loss by diffusion, in most cases. The effect of loss by diffusion is present in all cases but is more pronounced as dielectric constant increases. For reasons not well understood, materials having high dielectric constants diffuse rapidly through the untreated subject capsule walls and are lost to the environment, whether the walls are dried or swollen. Exchange is the term used to denote an exchange of one encapsulated material for a material which is not encapsulated but is in physical contact (liquid) with the subject capsules and is miscible with both the contained material and the water absorbed in the capsule walls. In the process of exchange through capsule walls, the phenomenon of diffusion is important and is used as a "tool," as it occurs in both directions—into and out of the capsule—in order to fill the capsules with a material different from that which they initially contained. Exchange of the materials through capsule walls is intentional and occurs when the walls are in a water-swollen state. During exchange, some shrinkage of the capsule wall volume takes place by loss of water to the equilibrium phases. In this state, the walls are susceptible of imbibing other materials, which limit diffusion.

The provision of this invention for an increase in capsule wall impermeability by imbibition of polyhydric material represents the essential substance of this invention. It has been hypothesized that microscopic pores or adsorption sites reamain throughout the shrunken capsule walls, and it is along these paths that the encapsulated internal phase material is attracted and migrates to escape. Surprisingly, it has been found that there are several polyhydric and other materials which can be utilized in a post-treatment of the capsule walls to effectively "plug" the paths of effusion and thereby stop, or substantially stop, the loss of the exchanged materials from capsules. The beneficial effects of this post-treatment, while apparent to some degree in all capsules prepared by the exchange method and so-treated, are strikingly demonstrated in the case of capsules containing highly polar liquids.

The capsule wall materials which are eligible for treatment by the teaching of this invention include hydrophilic polymeric materials capable of being utilized in the en masse formation of minute capsules to contain a water-insoluble and water-insensitive liquid or solid. Such wall materials as have been used include combinations of gelatin, gum arabic, poly(ethylene-co-maleic anhydride), poly(vinylmethylether-co-maleic anhydride), carrageenan, and agar-agar.

The original internal phase for use in capsules which are to be prepared by exchange through-the-wall and subsequently treated by the novel method can be any material substantially insoluble in the aqueous manufacturing vehicle and soluble in the exchange vehicle. It is obvious that these original internal phase materials must be chosen to cooperate with the particular system and ultimate exchanging material. Examples of originally encapsulated materials which have been successfully utilized include toluene, xylene, butyl acetate, corn oil, acetylated monoglycerides, and limonene. Of course, any essentially water-insoluble material which is dissolved by the exchange vehicle can be used.

The polyhydric materials eligible for use in the novel post-treatment of capsules containing highly polar liquids must be at least partially water-soluble and have a large number of hydroxyl or other groups which can strongly adsorb to the capsule wall material. Specific materials which can be used in the post-treatment include mannitol sorbitol, and mono- and disaccharides such as sucrose, fructose, glucose, maltose, lactose, and other, equivalent, sugars and sugar-like compounds. Other compounds which are eligible for testing as candidate materials for practicing the invention are materials which can strongly adsorb to the walls of capsules such as urea, glycols, polyglycols, and polyamides.

The invention, having been disclosed in a general manner, will now be explained by the use of specific examples. The examples, of course, should not be considered as limiting the invention either as to materials or as to specific techniques, as it will be apparent to all skilled in the art that equivalents can be easily thought of.

EXAMPLE 1 (PREFERRED)

This example describes the preparation of capsules finally containing ethanol from capsules which, originally, contained toluene. Ethanol, as an exchange vehicle, represents an important embodiment of this invention due to the widespread possibilities for use of encapsulated ethanol itself and due to the difficulty of its encapsulation according to the techniques of the prior art.

Into a two-liter vessel equipped with a heater and an agitator, were added 800 milliliters of distilled water, 180 milliliters of 11 percent, by weight, aqueous gum arabic solution, and 180 milliliters of 11 percent, by weight, aqueous gelatin (isoelectric point—pH 8 to 9, Bloom strength—285 to 305 grams) solution.

This mixture was heated to about 55 degrees centigrade, and 250 milliliters of toluene was added, with agitation, to yield toluene droplets 500 to 800 microns in diameter. The pH of the system was adjusted to 4.6, and the agitating system was allow to cool to about 25 degrees centigrade over a time period of about 1 to 2 hours. The system, now containing droplets of toluene encased by gelled walls of the gelatin-gum arabic complex, was chilled in an ice bath to about 10 degrees centigrade, at which temperature the system was filtered by means of a vacuum filtration apparatus, and the capsules were compressed into a tight filter cake. Thirty grams of the said filter cake was placed in a small flask and immersed three times with 150-milliliter portions of anhydrous ethanol— each immersion being of about one minute duration. The capsules were then immersed in a fourth 150-milliliter portion of anhydrous ethanol for about one hour. The reason for contact with four portions of fresh ethanol was primarily to dehydrate the capsule walls, but the repeated immersions also served to drive the equilibrium concentration of liquid inside the capsules almost to the point of pure ethanol. At the end of the fourth ethanol treatment, the capsules contained about 97 percent ethanol, and the supernatant ethanol was drained off. A fifth 150-milliliter portion of anhydrous ethanol was added to the capsule as a wash, and about 100 milliliters of the ethanol was subsequently discarded, leaving a slurry of ethanol-containing capsules in ethanol liquid. By this time, the capsule walls were fully dehydrated. While the capsule slurry was being swirled, 200 milliliters of the post-treatment solution was added slowly to the flask. The post-treatment system for this example was a solution of 100 milliliters of ethanol and 100 milliliters of a 50 percent, by weight, aqueous sucrose solution, a polydric material solution. The capsules were agitated in this post-treatment solution for about one hour, after which time the post-treatment solution was discarded, and the treated capsules were washed three times with 150-milliliter portions of anhydrous ethanol before drying.

The entire ethanol exchange and post-treatment process was carried out at room temperature (about 25 degrees centigrade). It should be recognized, however, that the exchange and novel post-treatment can be performed at other temperatures if care is taken to avoid temperature extremes which would cause freezing or boiling or other alteration, such as degradation, of the system components. As in most other diffusion processes, an elevated temperature increases the rate of exchange. It should also be understood that the en masse rate of exchange through the capsule walls is less for larger capsules, since diffusion is dependent upon area available for material transfer and the thickness of the capsule walls. It should be noted that the post-treatment solution contains approximately 25 percent, by weight, water. This water, which would normally cause re-swelling of the carefully dehydrated capsule walls, has little effect due to the presence, in solution, of the polyhydric treatment material. The treatment material allows only gradual permeation of water into the capsule walls, due to the treatment material's effect in curtailing diffusion through the capsule walls. The build-up of polyhydric material in the capsule wall shuts off the water diffusion that otherwise would swell the capsule walls and cause diffusion and subsequent dilution of the capsule contents by water.

EXAMPLE 2

This example was the same as Example 1 except that an edible material was substituted for the toluene of Example 1. The edible internal phase material was an almost wholly acetylated monoglyceride derived from lard and having good oxidative stability in ethanol. The product sold by Distillation Products Industries, a division of Eastman Kodak Company, Rochester, New York, United States of America, and having the trade name "Myvacet 9–40" was used in this example. "Myvacet 9–40" is a clear, colorless liquid having a viscosity at 20 degrees centigrade of 50 centipoises and a specific gravity of 0.99. In this example, the post-treatment system and procedure were the same as in Example 1.

The post-treatment solution can range, with regard to concentration of treatment material, from supersaturation to very dilute. The beneficial effect of post-treatment decreases with decrease in treatment material concentration and is most effective at or near saturation. The post-treatment solutions utilized in Examples 1 and 2 were supersaturated with respect to sucrose, crystals of sucrose being formed in the solution after a few days' storage in a closed container at laboratory conditions.

EXAMPLE 3

In this example, capsules which contained p-dioxane were prepared from capsules which originally contained toluene. The toluene-containing capsules which were utilized were prepared according to the teaching of the above-cited U.S. Pat. No. 3,190,837, in which the capsule wall materials comprised gelatin, gum arabic, and two different molecular weight fractions of poly(ethylene-co-maleic anhydride). The poly(ethylene-co-maleic anhydride) materials were identified as "EMA–11" and "EMA–31," having molecular weights of 1,000 to 2,000 and 60,000 to 70,000, respectively, and sold by Monsanto Chemical Company, St. Louis, Mo., United States of America. The toluene-containing capsules had been prepared to contain 85 to 90 percent, by weight, toluene and were obtained in a dry, free-flowing form not differing greatly, in appearance, from grains of white sand except that some of the capsules were as large as about 1,000 microns. (The capsules of Examples 1 and 2, of course, can also be prepared as free-flowing grains.) The exchange process for this example was very similar to that of Examples 1 and 2 except that water was added to the exchange vehicle—p-dioxane in this case—in order to swell the initially dry and rigid capsule walls. In other words, the dry capsules were re-swollen to give them the exchange property. Exchange occurs rapidly through capsule walls which contain absorbed water; and, with this in mind, 25 grams of the capsules to be treated were given four immersions in dioxane-water solutions, fifteen minutes being allowed for each immersion before the solvent was discarded. The dioxane-water concentrations utilized are indicated in the following table:

| | Dioxane (ml.) | Water (ml.) |
|---|---|---|
| Immersion Number: | | |
| 1 | 112 | 38 |
| 2 | 127 | 23 |
| 3 | 135 | 15 |
| 4 | 142 | 8 |

After the above four immersions, the capsules were drained and were stirred with 150 milliliters of anhydrous p-dioxane, for two hours, to complete the exchange process. At the end of this two-hour treatment, about 100 milliliters of the supernatant solvent-liquid was decanted and 200 milliliters of the post-treatment polyhydric solution was slowly added while the capsule slurry was swirled. In this example, the post-treatment solution consisted of 100 millilters of p-dioxane and 100 milliliters of an 83 percent, by weight, solution of an industrial grade of sorbitol sold as "Arlex" by Atlas Powder Company, Wilmington, Del., United States of America. The capsules were agitated in this post-treatment-solution-containing system for about three hours, after which time the post-treatment solution was discarded and the treated capsules were subjected to three additional immersions, each of one minute duration, with anhydrous p-dioxane before the capsules were spread out on a laboratory bench to dry.

As an option, the walls of these capsules could have been chemically hardened, during the original encapsulation of toluene, by the use of formaldehyde, glutaraldehyde, or other known chemical hardening agents for gelatin, because, although hardened, the capsule walls still swell and act as diffusion membranes.

EXAMPLE 4

This example is identically the same as Example 3, except that a solution of 1:1, by weight, p-dioxane/ethanol replaced the p-dioxane in every instance, including the post-treatment solution. This experiment was run to prove the capability of exchanging a mixture of solvents through a capsule wall. The final capsule product contained, as exchanged portion, 49.5 percent, by weight, p-dioxane and 50.5 percent, by weight, ethanol, an almost 1:1 ratio.

EXAMPLE 5

This example represents repeat trials of Examples 3 and 4 wherein the only changes were that the post-treatment solutions were 75 percent, by weight, exchange vehicle and 25 percent, by weight, water saturated with urea at about 35 to 40 degree centigrade and used at that warm temperature to maintain solution of the urea.

EXAMPLE 6

This example demonstrated the use of another type of capsule wall for use in exchange through the wall.

Two solutions were prepared:

(1) One gram of carrageenan (grade "HWG" as sold by Marine Colloids, Incorporated, Rockland, Maine, United States of America) was slowly adde to 200 grams of vigorously stirred water at about 25 degrees centigrade. The mixture was then warmed to 55 degrees centigrade to complete solution of the carrageenan, and the pH of the solution was adjusted to 6.7.

(2) Five hundred fifty milliliters of water and 7.5 grams of gelatin of the same type as that used in Example 1 were stirred together and warmed in a one-liter beaker until the gelatin was dissolved and the solution temperature was 50 degrees centigrade. The pH was then adjusted to 6.2.

Sixty milliliters of "Myvacet 9–40" was added to the now gently agitated, 50-degree-centigrade, gelatin solution (2). Droplets of the dispersed oil were about 1,000 microns in diameter. While the stirring and the temperature were maintained, 120 grams of the carrageenan solution (1) was added to the gelatin solution, drop-wise, over a period of ten to fifteen minutes. After addition of the carrageenan solution, the oil droplets could be observed microscopically to be individually encased in a clear, liquid, capsule wall material. The system was cooled to about 25 to 30 degrees centigrade in about one hour in order to gel the embryonic capsule walls, and the capsule-containing system was then chilled to about 10 degrees centigrade and filtered to form a filter cake of capsules for use in the exchange process. These capsules, having walls of gelatin and carrageenan, were utilized in the exchange-through-the-wall processes in exactly the same manner as capsules in the other examples. The post-treatment solutions of sucrose and the process steps were also identical with the other examples.

What is claimed is:

1. In the process for replacing, en masse, the liquid water-immiscible contents of hydrophilic-polymeric-material-walled capsules, without rupturing said capsule walls, including the steps of: (a) providing capsules having liquid water-immiscible contents and capsule walls which are swollen due to water absorbed therein; and (b) dispersing said swollen-walled capsules in a liquid vehicle which is a solvent for both the absorbed water and the liquid water-immiscible capsule contents wherein the vehicle is transferred, by diffusion through the capsule wall, to the capsule interior, thereby replacing the original liquid water-immiscible capsule contents and establishing, in time, a concentration equilibrium between the water-immiscible material and the vehicle and substantially dehydrating the capsule wall, the improvement which consists of immersing the capsules with replaced contents of step (b) having substantially dehydrated capsule walls in an aqueous post-treatment solution, said post-treatment solution comprising 1 to 3 parts, by weight, vehicle, 1 to 2 parts, by weight, water and 1 to 2 parts, by weight, material taken from the group consisting of mannitol, sorbitol, sucrose, fructose, glucose, maltose, lactose, and urea, separating the capsules from the post-treatment solution and then redispersing the capsules in liquid vehicle.

2. The capsules produced by the process of claim 1.

3. The process of claim 1 wherein the polyhydric material is sucrose.

4. The process of claim 1 wherein the exchange vehicle is ethanol.

5. The process of claim 3 wherein the exchange vehicle is ethanol.

6. In the process for replacing the water-immiscible contents of gelled hydrophilic-polymeric-material-walled capsules through the capsule walls, without rupture of the capsule walls, including the steps of: (a) providing such capsules, with their walls being in a swollen state due to absorbed water; and (b) dispersing said capsules of step (a) in a liquid vehicle which is a mutual solvent for the absorbed water and the capsule contents, the original water-immiscible contents being substantially replaced with the vehicle by diffusion through the capsule walls continuing to a diffusion equilibrium state over a period of time wherein the capsule walls are substantially dehydrated, the improvement which comprises treating the capsules with replaced contents after step (b) by: (c) dispersing said capsules with replaced contents and substantially dehydrated capsule walls in an aqueous treatment solution comprising 1 to 3 parts, by weight, vehicle having a dielectric constant greater than about 20, 1 to 2 parts, by weight, water and 1 to 2 parts, by weight, material taken from the group consisting of mannitol, sorbitol, sucrose, fructose, glucose, maltose, lactose, and urea and then redispersing the capsules in liquid vehicle.

7. The capsules produced by the process of claim 6.

8. The process of claim 6 wherein the exchange vehicle is ethanol.

References Cited

UNITED STATES PATENTS 3,033,754   5/1962   Krahnke et al. _____ 424—33

FOREIGN PATENTS 949,910   2/1964   Great Britain.

RICHARD D. LOVERING, Primary Examiner

U.S. Cl. X.R.

99—118; 117—62.2, 100; 424—33, 34, 37

UNITED STATES PATENT OFFICE
CERTIFICATE OF CORRECTION

Patent No. 3,520,821          Dated July 21, 1970

Inventor(s) David J. Striley and James E. Williams

It is certified that error appears in the above-identified patent and that said Letters Patent are hereby corrected as shown below:

Column 1, line 39, "entitled" should be --titled--. Column 2, lines 21 and 22 should be --ing the subject of several issued United States patents--No. 2,800,457, which issued July 23, 1957, on the application--. Column 3, line 8, "reamain" should be --remain--. Column 4, line 7, "allow" should be --allowed--; line 37, "polydric" should be --polyhydric--; line 43, "The entire ethanol exchange" should be --The entire exchange--; line 75, "oxidative stability in ethanol" should be --oxidative stability and solubility in ethanol--. Column 6, line 24, "degree" should be --degrees--; line 33, "adde" should be --added--.

NOV 3 1970

(SEAL)
Attest:

Edward M. Fletcher, Jr.
Attesting Officer

WILLIAM E. SCHUYLER, JR.
Commissioner of Patents

X-1191-67  2-13-70  NCR